No. 713,351. Patented Nov. 11, 1902.
C. H. SHEPARD.
PNEUMATIC TIRE.
(Application filed Nov. 1, 1900.)

(No Model.)

Witnesses.
Robert Everett,
H. B. Keefer

Inventor.
Charles H. Shepard.
By James L. Norris.
Atty.

UNITED STATES PATENT OFFICE.

CHARLES H. SHEPARD, OF NORTH PLAINFIELD, NEW JERSEY.

PNEUMATIC TIRE.

SPECIFICATION forming part of Letters Patent No. 713,351, dated November 11, 1902.

Application filed November 1, 1900. Serial No. 35,144. (No model.)

*To all whom it may concern:*

Be it known that I, CHARLES H. SHEPARD, a citizen of the United States, residing at North Plainfield, in the county of Somerset and State of New Jersey, have invented new and useful Improvements in Pneumatic Tires, of which the following is a specification.

My invention relates to pneumatic tires for bicycles and other vehicles, the object of the same being to provide a tire of this kind which is puncture-proof, which has greater resiliency than the ordinary pneumatic tire, has increased strength and durability, and which is less liable to creep or shift on the rim.

The novel features of the invention will be defined in the claims.

Figure 1:
Figure 2:
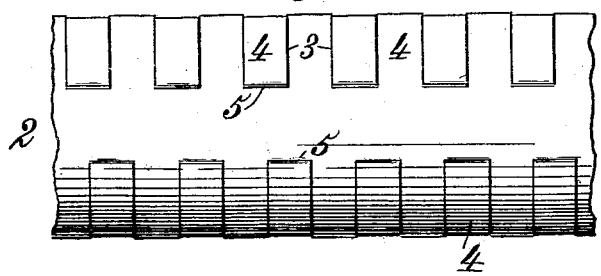
Figure 3:
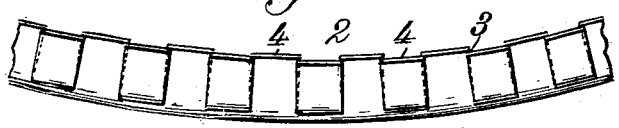
Figure 4:
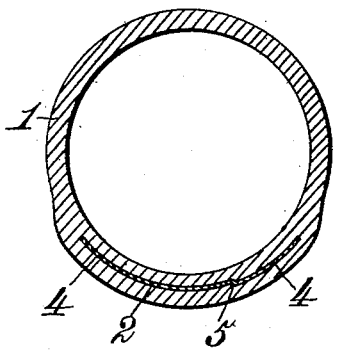

In the drawings forming part of this specification, Figure 1 is a cross-sectional view of the armor. Fig. 2 is a plan view thereof. Fig. 3 is a side view. Fig. 4 is a cross-sectional view of the tire with the armor applied thereto.

Like reference-numerals indicate like parts in the different views.

My improved tire consists of the tubular rubber portion 1, having a metallic plate 2, constituting an armor embedded in the tread portion thereof. The blank from which the plate 2 is formed is provided with lateral incisions 3 3, extending from the side edges of the blank to points a short distance from the central or medial line. The incisions 3 form laterally-projecting tongues 4 4 on opposite sides of the plate, and as the incisions 3 on one side are opposite the spaces between the incisions 3 on the other side the tongues 4 4 are arranged in staggered relation to each other. The tongues 4 on each side of the armor-plate 2 are alternately formed with upwardly-extending crimps 5 5 adjacent to the points of connection of said tongues with the body of the plate 2. By this construction when the blank from which the plate 2 is made is laterally dished and longitudinally curved to conform to the shape of the tread-surface of the tire the crimped tongues 4 will overlap the adjacent uncrimped tongues on opposite sides thereof throughout their entire length. In this way the necessity for causing the overlapping of the tongues 4 by hand when the plate 2 is inserted in the tube 1 is avoided, and, furthermore, when the tire yields at different points, due to the rotation of the wheel on which it is mounted and the weight carried by the vehicle containing the wheel, the armor-plate 2 may yield both longitudinally and laterally and afterward return to its normal position without danger of one set of the tongues 4 getting out of proper relation to the adjacent tongues. By arranging the incisions 3 in the manner stated—that is, with those on one side opposite the spaces between those on the other side and with those on both sides terminating short of the medial line of said plate—an armor-plate is obtained which is much stronger with the same amount of material than one in which the incisions on one side of the plate are arranged directly opposite those on the other.

My improved method of making the tire above described consists in slitting and bending a blank sheet of annealed steel to form the armor-plate, tempering the material of said plate, coating or plating with zinc the surface of said plate, embedding the plate thus formed, tempered, and coated in the ground or tread surface of an unvulcanized rubber tube containing sulfur in its composition, and vulcanizing the tube to produce the completed tire and to cause the metal armor-plate and the rubber to be firmly cemented to each other. Of course instead of steel as the material from which the plate 2 is made I may use any other equivalent material. I prefer steel, however, because of its strength and quality of being easily tempered. Instead of coating or plating the armor-plate with zinc, as above stated, I may coat or plate the same with brass or any other metallic alloy containing zinc. Where the term "zinc" is used, therefore, in the following claims, I desire to have it understood that it is intended to cover either metallic zinc or some metallic alloy containing zinc. When the armor-plate plated with zinc or an alloy containing zinc is brought into contact with the tube 1, containing sulfur, and the latter is vulcanized, sulfid of zinc is formed, which serves as a means for firmly, positively, and securely cementing the two parts together.

I find that a closer and more perfect cementing action between the coated armor-plate and the rubber may be obtained if before the armor-plate is applied to the tube 1 the outer surface thereof is roughened either by the application of acids thereto or by rubbing the same with coarse emery, sandpaper, or the like.

A tire constructed in accordance with the foregoing description is extremely resilient, more so than the ordinary pneumatic tire, as the laterally-projecting overlapping tongues 4 of the armor-plate 2 add their resiliency to that afforded by the air under pressure in the tire. Furthermore, the plate 2 serves to prevent the puncture of the tire, and thereby adds to its strength and durability. Furthermore, with the continuous metallic plate extending around the tread-surface of the tire the tendency of the same to creep or shift on the rim is reduced to a minimum.

Having now described my invention, what I claim as new, and desire to secure by Letters Patent, is—

1. A pneumatic tire having a metallic armor-plate embedded in the tread-surface thereof, said plate having laterally-projecting tongues arranged in staggered relation on opposite sides thereof formed by lateral incisions in the plate, the incisions on one side lying opposite the spaces between the incisions on the opposite side and those on both sides terminating short of the medial line of said plate, as and for the purpose set forth.

2. In a pneumatic tire having a metallic armor-plate embedded in the tread-surface thereof, the said plate having laterally-projecting tongues on opposite sides formed by lateral incisions, the alternate tongues on each side of said plate being crimped upwardly and overlapping the edges of the adjacent tongues.

In testimony whereof I have hereunto set my hand in presence of two subscribing witnesses.

CHARLES H. SHEPARD.

Witnesses:
   CHARLES L. MOFFETT,
   WILHILMINA VROOM.